Figure 1:
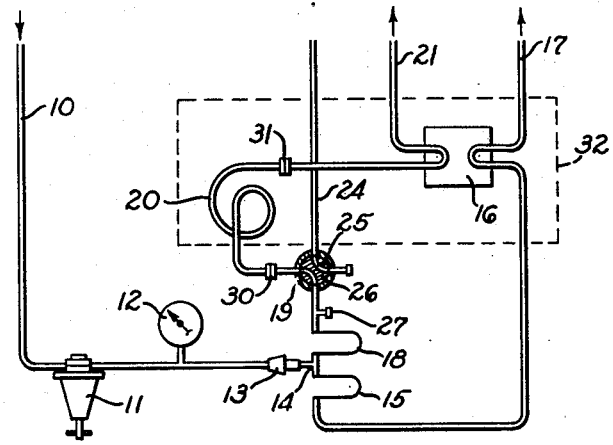

Dec. 1, 1964 W. DONNER ETAL 3,159,020

GAS CHROMATOGRAPH

Original Filed April 22, 1957

INVENTORS.
WALTER DONNER
DON WAYNE CARLE
BY THEIR ATTORNEYS.
HARRIS, KIECH, RUSSELL & KERN

United States Patent Office 3,159,020
Patented Dec. 1, 1964

3,159,020
GAS CHROMATOGRAPH
Walter Donner, 627 S. Cedar St., Brea, Calif., and Don Wayne Carle, 9281 Gordon Ave., Whittier, Calif.
Original application Apr. 22, 1957, Ser. No. 654,158, now Patent No. 3,062,037, dated Nov. 6, 1962. Divided and this application Oct. 1, 1962, Ser. No. 227,612
3 Claims. (Cl. 73—23.1)

This invention relates to gas chromatography and, in particular, to a gas chromatograph in which the effects of variations in flow characteristics are minimized or substantially eliminated so that highly reproducible test results may be obtained.

This application is a division of our copending application entitled "Temperature Regulator For Chromatographs," Serial No. 654,158, filed April 22, 1957 now Patent No. 3,062,037 issued November 6, 1962.

A chromatograph is used in determining the identity and proportions of the components of a fluid mixture. In a typical instrument, a carrier gas is continuously passed through a chamber or column which is packed with a granular material having particular adsorption characteristics or which is coated with a liquid having particular gas solubility characteristics. A small quantity of the sample to be analyzed is introduced into the carrier ahead of the column at a noted time. The various components of the sample are separated within the column and exit at different times, the elapsed time being an indication of the identity of the component. The presence and proportion of the various components in the exit carrier gas are detected by conventional means, such as by a thermal conductivity cell. This invention is concerned with an improved form of gas chromatograph having superior operating characteristics.

It is an object of this invention to provide a chromatograph in which the carrier gas is divided into two branches with one branch leading to the detector unit through the chromatographic column and the other branch leading directly to the detector unit so that pressure drops occurring across the column do not affect the output of the instrument. A further object of the invention is to provide such a chromatograph having flow restrictors in each of the branches with the impedance of the flow restrictors being considerably greater than the impedance of the column.

The invention also comprises novel details of construction and novel combinations and arrangements of parts, which will more fully appear in the course of the following description. The drawing merely shows and the description merely describes a preferred embodiment of the present invention which is given by way of illustration or example.

Figure 2:
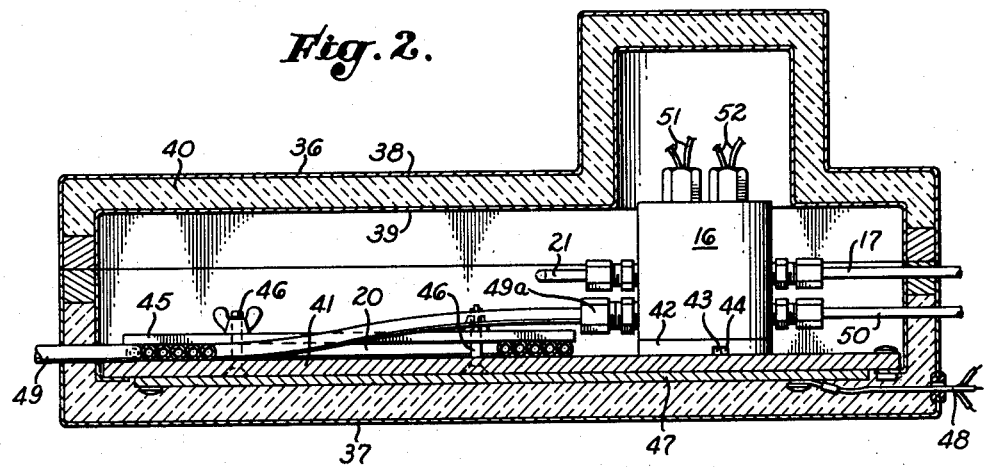

In the drawing:
FIG. 1 is a schematic diagram of a gas chromatograph embodying the teachings of the invention; and
FIG. 2 is a vertical sectional view of the chromatograph of FIG. 1.

The gas chromatograph of the invention, as shown in FIG. 1, includes a carrier gas inlet line 10, a pressure regulator 11, a pressure gauge 12 for indicating the outlet pressure of the regulator 11 and a filter 13 in the line between the pressure regulator and a T junction 14. The carrier gas from the inlet line is divided at the T junction 14 with one branch leading through a flow restrictor 15 and the reference chamber of a detector cell 16 to an exhaust line 17. The other branch passes through another flow restrictor 18, a sample introducing valve 19, a chromatographic column 20 and the sample chamber of the detector cell 16 to an exhaust 21.

The flow restrictors 15 and 18 are intended to provide an impedance to fluid flow therethrough and may have any suitable form, such as a capillary orifice or an elongated tube. Such a flow restrictor will have a substantially fixed impedance which is reproducible over a long period of time.

A predetermined quantity of a sample may be introduced into the carrier gas by the sample introducing valve 19. A line 24, which may first be evacuated, is filled with the sample to any desired pressure, thereby leaving a predetermined quantity of the sample in a passage 25 in a core 26 of the valve. The core is then rotated 180° to place the passage 25 in line between the flow restrictor 18 and the column 20, thus introducing the sample into the sample line. An alternative sample injection fitting 27 is also in the line between the flow restrictor 18 and the column 20. This fitting is provided with a heavy rubber septum which may be pierced by the needle of a hypodermic syringe permitting introduction of samples, particularly liquids, into the sample line.

The column 20 may be a length of tubing packed with a granular material which is treated to have particular gas absorbing or adsorbing characteristics. The tubing may be bent to any form but is preferably a flat, multi-turn spiral and is provided with connectors 30, 31 so that columns of different characteristics may be substituted into the instrument.

The detector cell 16 may be a conventional thermal conductivity cell having two identical chambers with identical temperature sensitive elements positioned in each chamber. These elements are preferably connected in a bridge circuit so that differences in temperatures of the elements caused by differences in the cooling properties of the sample and reference gas streams passing through the chambers will be reflected in the output of the bridge. When the cooling properties or thermal conductivities of the carrier gas and a component of the sample gas are different, an indication will be obtained when such component passes through the detector cell. The time lapse between introduction of the sample and passage of a particular component through the detector cell is an indication of the identity of the component and the magnitude of the indicated output of the detector cell is a measure of the relative amount of the component in the sample.

The flow impedances of the flow retrictors 15 and 18 are made large relative to the flow impedance of the column 20 so as to substantially equalize the steady state and dynamic flow conditions in both chambers of the detector. The two restrictors may be identical with identical flow impedances and, since such impedance is substantially larger than that of a column, satisfactory operation will be obtained. However, it is preferred to make the impedance of the restrictor 15 equal to that of the restrictor 18 plus the column 20 providing equivalent flow conditions in both the sample and reference branches. Thus it is seen that the use of two gas flow branches with fixed flow restrictors in each branch substantially eliminates errors previously resulting from variations in inlet flow characteristics and reaction column flow characteristics, since such effects influence both chambers of the detector substantially equally and hence do not appreciably upset the balance of the bridge.

The indicated output of a gas chromatograph is a function of the temperature of the column and the temperature of the detector cell. Moreover, the zero-drift of the instrument is largely dependent on the degree of temperature regulation of the detector cell. Hence, in order to obtain reproducible results, it is necessary to operate the instrument at a known and substantially constant temperature. Furthermore, different mixtures are best analyzed at different temperatures, and, therefore, it is desirable to have an instrument which may be operated at any one of a plurality of known operating temperatures. Therefore, most gas chromatographs incorporate some form of heating unit and some form of temperature control. The present application contemplates a temperature controlled gas chromatgoraph having an unusually compact physical arrangement of components, and a temperature sensing and continuous heat control circuit for accurately maintaining the desired operating temperature. Such instruments have a greatly improved signal output stability and up to ten-fold improvement in zero-drift as compared with known prior instruments.

An important feature is the conductive coupling together of the thermally controlled elements of the instrument. This construction provides extremely close thermal coupling as contrasted with instruments of the prior art which have used convective coupling, or heat transfer by means of circulating air.

The column 20 and the detector cell 16 are mounted within a thermally insulated box which is indicated by a dashed line 32 in FIG. 1. A preferred form for the box is shown in detail in FIG. 2 and includes mating top 36 and bottom 37 which may be clamped together to form the enclosure for the column 20 and the detector cell 16. The top 36 has spaced inner and outer walls 38, 39 with the space between the walls filled with a good thermal insulator 40. The bottom 37 is constructed similarly to the top 36 with a portion of the inner wall being replaced by a mounting plate 41 which is composed of a material having high thermal conductivity such as a metal, aluminum being a preferred material. The mounting plate 41 is of substantial thickness so that the total effective thermal conductance from any portion of the plate to any other will be high. The coil 20 is mounted on the plate 41 with substantially the entire length of the coil in direct physical contact with the plate and preferably is clamped to the plate with a bar 45 and wing-nut and screw assemblies 46. The detector cell 16 may also be mounted directly on the plate 41 but is preferably mounted on an intermediate plate 42 which in turn is mounted on the mounting plate 41. The intermediate plate should also be of a material having high thermal conductivity, such as aluminum, and is provided with an opening 43 in which a temperature sensing element 44 may be positioned, so as to be thermally adjacent the coil 20 and the cell 16. An electric heating unit 47 is mounted in close contact with the underside of the plate 41 with electrical connections being made to the heating unit through a cable 48, the unit preferably being of the flat, extended-area type.

The carrier gas containing the sample to be analyzed flows into the column 20 from the valve 19 (shown only in FIG. 1) at 49, then into the sample chamber of the detector cell as 49a and out the exhaust 21. The carrier gas from the other branch flows from the restrictor 15 (shown only in FIG. 1) into the reference chamber of the detector cell at 50 and out the exhaust 17. Electrical connections 51, 52 permit coupling the resistances of the detector cell into the control circuitry.

The mounting of the heating unit, the column and the detector cell on a common plate having high thermal conductance provides very rapid heat transfer from the heating unit to the other components and results in very short time delays when the operating temperature is being changed. Furthermore, the entire column is at substantially the same temperature since there is direct heat transfer by conduction from the heating unit through the mounting plate to all portions of the column, eliminating thermal gradients along the column. Because of the close thermal coupling between the components of the instrument within the enclosure, maximum local temperatures do not greatly exceed the nominal temperature at the column and detector. The close thermal coupling also permits the physical assembly to be quite compact and therefore the surface area of the enclosure is small. For these reasons, the heat loss is quite low and, therefore, low power heating units may be utilized.

The circuitry for controlling the power supplied to the heating unit and to the detector cell is shown and described in detail in our aforesaid copending application, Serial No. 654,158, particularly in FIGS. 3–7. The power supplied to the heating units may be continuously varied by the control circuitry in order to maintain the temperature at the temperature sensing element 44 constant, thus eliminating swings in the operating temperature which would be caused by off-on operation of the heating units.

Although an exemplary embodiment of the invention has been disclosed and discussed, it will be understood that other applications of the invention are possible and that the embodiments disclosed may be subjected to various changes, modifications and substitutions without necessarily departing from the spirit of the invention.

We claim as our invention:
1. In a chromatograph, the combination of:
an inlet;
a chromatographic column having an impedance to fluid flow;
a detector unit having sample and reference chambers;
a first flow restrictor having an impedance to fluid flow;
a second flow restrictor having an impedance to fluid flow;
conduit means providing at least two separate flow paths for conducting a fluid from said inlet, through said first restrictor and said column to said sample chamber of said detector, and from said inlet through said second restrictor to said reference chamber, of said detector, the flow impedance of said second restrictor being substantially equal to the combination of the flow impedances of said first restrictor and said column; and
means for introducing a sample into said conduit means between said first restrictor and said column.
2. In a chromatograph, the combination of:
an inlet;
a chromatographic column having an impedance to fluid flow;
a thermal conductivity detector unit having sample and reference chambers;
a first elongated tubular constriction providing a predetermined impedance to fluid flow;
a second elongated tubular constriction providing a predetermined impedance to fluid flow, the impedance of each of said constrictions being substantially greater than the impedance of said column;
conduit means for conducting a fluid from said inlet, through said first constriction and said column to said sample chamber, and from said inlet through said second constriction to said reference chamber; and
means for introducing a sample into said conduit means between said first constriction and said column.
3. In a chromatograph, the combination of:
an inlet;
a detector unit having sample and reference chambers;
a first flow restrictor having a relatively large impedance to fluid flow;
a second flow restrictor having an impedance to fluid flow which is substantially equal to that of said first restrictor;
a chromatograph column having a relatively small im- pedance to flow, said impedance of said chromatograph column being substantially insignificant in comparison to said impedance to flow of said first and second flow restrictors;

conduit means providing at least two separate flow paths for conducting a fluid from said inlet, through said first restrictor and said column to said sample chamber of said detector, and from said inlet through said second restrictor to said reference chamber of said detector; and means for introducing a sample into said conduit means between said first restrictor and said column.

References Cited in the file of this patent
UNITED STATES PATENTS

| | | |
|---|---|---|
| 2,728,219 | Martin | Dec. 27, 1955 |
| 2,868,011 | Coggeshall | Jan. 13, 1959 |
| 3,041,869 | Spracklen et al. | July 3, 1962 |
| 3,056,277 | Brenner | Oct. 2, 1962 |

UNITED STATES PATENT OFFICE
CERTIFICATE OF CORRECTION

Patent No. 3,159,020                              December 1, 1964

Walter Donner et al.

It is hereby certified that error appears in the above numbered patent requiring correction and that the said Letters Patent should read as corrected below.

In the grant, lines 1 and 2, for "Walter Donner, of Brea, California, and Don Wayne Carle, of Whittier, California," read -- Walter Donner, of Brea, California, and Don Wayne Carle, of Whittier, California, assignors to Beckman Instruments, Inc., of Fullerton, California, a corporation of California, --; line 11, for "Walter Donner and Don Wayne Carle, their heirs" read -- Beckman Instruments, Inc., its successors --; in the heading to the printed specification, lines 3 and 4, for "Walter Donner, 627 S. Cedar St., Brea, Calif., and Don Wayne Carle, 9281 Gordon Ave., Whittier, Calif." read -- Walter Donner, Brea, Calif., and Don Wayne Carle, Whittier, Calif., assignors to Beckman Instruments, Inc., Fullerton, Calif., a corporation of California --.

Signed and sealed this 20th day of April 1965.

(SEAL)
Attest:

ERNEST W. SWIDER                            EDWARD J. BRENNER
Attesting Officer                        Commissioner of Patents